(12) United States Patent
Matsukawa et al.

(10) Patent No.: US 8,578,177 B2
(45) Date of Patent: Nov. 5, 2013

(54) RECORDING DEVICE, AND CONTENT-DATA PLAYBACK SYSTEM

(75) Inventors: Shinichi Matsukawa, Suginami-ku (JP); Taku Kato, Kamakura (JP); Akihiro Kasahara, Sanbu-gun (JP); Hiroshi Suu, Chigasaki (JP); Atsushi Kondo, Yokohama (JP); Jun Sato, Kokubunji (JP); Akira Miura, Sagamihara (JP); Hiroyuki Sakamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 756 days.

(21) Appl. No.: 12/717,458

(22) Filed: Mar. 4, 2010

(65) Prior Publication Data
US 2010/0268953 A1 Oct. 21, 2010

(30) Foreign Application Priority Data

Apr. 16, 2009 (JP) .................................. 2009-099870
Aug. 7, 2009 (JP) .................................. 2009-184176

(51) Int. Cl.
*G06F 12/14* (2006.01)

(52) U.S. Cl.
USPC .............. 713/193; 380/44; 380/201; 380/277

(58) Field of Classification Search
USPC ............ 380/44, 200–202, 277; 713/168–170, 713/193; 705/50–56
See application file for complete search history.

(56) References Cited

U.S. PATENT DOCUMENTS

| | | | |
|---|---|---|---|
| 7,065,648 B1 | 6/2006 | Kamibayashi et al. | |
| 2002/0085715 A1* | 7/2002 | Ripley | 380/202 |
| 2002/0141577 A1* | 10/2002 | Ripley et al. | 380/201 |
| 2005/0081047 A1* | 4/2005 | Kitani | 713/193 |

(Continued)

FOREIGN PATENT DOCUMENTS

| | | |
|---|---|---|
| JP | 6-97931 A | 4/1994 |
| JP | 2001-14441 A | 1/2001 |

(Continued)

OTHER PUBLICATIONS

Office Action issued Oct. 16, 2012, in Japanese Patent Application No. 2009-184176 with English translation.

(Continued)

*Primary Examiner* — Nirav B Patel
(74) *Attorney, Agent, or Firm* — Oblon, Spivak, McClelland, Maier & Neustadt, L.L.P.

(57) ABSTRACT

A recording device configured to store content data in an encrypted manner, the recording device comprises a memory unit which stores various data, and a controller which controls the memory unit. The controller possesses a controller key and unique identification information, and is configured to generate a controller-unique key unique for each controller in accordance with the controller key and the identification information. The memory unit stores an MKB generated by encrypting a medium key with a device key set that is a collection of a plurality of device keys, an encrypted device key set generated by encrypting the device key set with the controller-unique key, and a device-key-set index which uniquely identifies the device key set. The controller comprises a decryption unit which obtains a device key set by decrypting the encrypted device key set with the controller-unique key, an ID generating unit which generates a medium ID from the identification information and the device-key-set index, and an authentication unit which executes an authentication process with an exterior in accordance with the device key set, the medium ID and the MKB.

7 Claims, 5 Drawing Sheets

(56) References Cited

U.S. PATENT DOCUMENTS

| | | | |
|---|---|---|---|
| 2005/0154905 A1* | 7/2005 | Kojima et al. | 713/193 |
| 2005/0213767 A1 | 9/2005 | Matsukawa et al. | |
| 2007/0116268 A1 | 5/2007 | Kasahara et al. | |
| 2008/0219451 A1* | 9/2008 | Ju et al. | 380/282 |
| 2009/0232314 A1 | 9/2009 | Kato et al. | |
| 2010/0183148 A1* | 7/2010 | Bellwood et al. | 380/44 |

FOREIGN PATENT DOCUMENTS

| | | |
|---|---|---|
| JP | 2004-208088 A | 7/2004 |
| JP | 2005-341156 | 12/2005 |
| JP | 2006-198529 | 8/2006 |
| JP | 2006-198529 A | 8/2006 |
| JP | 2008-234217 A | 10/2008 |
| WO | WO 2008/018457 A1 | 2/2008 |
| WO | WO 2009/045665 A1 | 4/2009 |

OTHER PUBLICATIONS

Office Action issued Aug. 28, 2012, in Japanese Patent Application No. 2009-184176 with English translation.

"Toward realization of pay-at-source utilizing technology and contracts", Copyright Protection Technology, Japan Electronics and Information Technology Industries Association [Online], May 17, 2006, document 4, URL,<http://www.mext.go.jp/b_menu/shingi/bunka/gijiroku/020/06051709/004.pdf>, 21 pages with English translation.

* cited by examiner

RECORDING DEVICE, AND CONTENT-DATA PLAYBACK SYSTEM

CROSS-REFERENCE TO RELATED APPLICATIONS

This application is based upon and claims the benefit of priority from the prior Japanese Patent Application No. 2009-99870, filed on Apr. 16, 2009, and the prior Japanese Patent Application No. 2009-184176, filed on Aug. 7, 2009, the entire contents of which are incorporated herein by reference.

BACKGROUND OF THE INVENTION

1. Field of the Invention

The present invention relates to a content-data playback system enabling playback of content data while eliminating fraudulent use thereof, and a recording device used thereto.

2. Description of the Related Art

Recently, content-distributing systems which distribute computerized content, such as books, newspapers, music, or motion pictures, to user terminals to allow users to view such content become widespread in accordance with the development of information societies.

However, computerized content (hereinafter, simply called "content") can be easily replicated, so that misconduct disregarding copyrights thereof is likely to happen. In general, from the standpoint of protecting content against such misconduct, content is recorded in an encrypted manner by an encryption key, and decrypted when reproduced. An example of such kind of content protection technologies is CPRM (Content Protection for Recordable Media). Moreover, there is proposed an encryption double-key scheme that uses two kinds of keys to doubly encrypt content (see, for example, JP2005-341156A). This kind of encryption double-key scheme is used in, for example, MQbic, (registered trademark). In encryption keys, a key unique to a recording medium, e.g., a medium-unique key is stored securely in a secret area in the recoding medium, and is not externally-accessible at all. Therefore, even if, for example, an encrypted content key is solely copied fraudulently, a person who fraudulently copied that key cannot utilize content data without the medium-unique key.

However, if such a medium-unique key is fraudulently read-out through some kind of scheme and is passed to a fraudulent card copying person, it results in cloned cards, made by copying of a legitimate card, floating around, so that fraudulent use of content data may happen.

SUMMARY OF THE INVENTION

A recording device configured to store content-data in an encrypted manner according to a first aspect of the present invention comprises a memory unit which stores various data, and a controller which controls the memory unit. The controller possesses a controller key and unique identification information, and is configured to generate a controller-unique key unique for each controller in accordance with the controller key and the identification information. The memory unit stores an MKB generated by encrypting a medium key with a device key set that is a collection of a plurality of device keys, an encrypted device key set generated by encrypting the device key set with the controller-unique key, and a device-key-set index which uniquely identifies the device key set. The controller comprises a decryption unit which obtains a device key set by decrypting the encrypted device key set with the controller-unique key, an ID generating unit which generates a medium ID from the identification information and the device-key-set index, and an authentication unit which executes an authentication process with an exterior in accordance with the device key set, the medium ID, and the MKB.

A recording device configured to store content-data in an encrypted manner according to a second aspect of the present invention comprises a memory unit which stores various data, and a controller which controls the memory unit. The controller possesses a controller key and unique identification information, and is configured to generate a controller-unique key unique for each controller in accordance with the controller key, the identification information, and secret information given to the controller. The memory unit stores an MKB generated by encrypting a medium key with a device key set that is a collection of a plurality of device keys, an encrypted device key set generated by encrypting the device key set with the controller-unique key, and a device-key-set index which uniquely identifies the device key set. The controller comprises a decryption unit which obtains a device key set by decrypting the encrypted device key set with the controller-unique key, an ID generating unit which generates a medium ID from the identification information and the device-key-set index, and an authentication unit which executes an authentication process with an exterior in accordance with the device key set, the medium ID, and the MKB.

A content-data playback system according to a third aspect et the present invention comprises a recording device which stores content-data in an encrypted manner, and a host device capable of decrypting encrypted content data and of playback thereof, and the recording device comprises a memory unit which stores various data, and a controller which controls the memory unit. The controller possesses a controller key and unique identification information, and is configured to generate a controller-unique key unique for each controller in accordance with the controller key and the identification information. The memory unit stores an MKB generated by encrypting a medium key with a device key set that is a collection of a plurality of device keys, an encrypted device key set generated by encrypting the device key set with the controller-unique key, and a device-key-set index which uniquely identifies the device key set. The controller comprises a decryption unit which obtains a device key set by decrypting the encrypted device key set with the controller-unique key, an ID generating unit which generates a medium ID from the identification information and the device-key-set index, and a first authentication unit which executes an authentication process with the host device in accordance with the device key set, the medium ID, and the MKB. The host device comprises a recording unit which stores the device key set and the MKB, and a second authentication unit which executes an authentication process with the recording unit in accordance with the device key set and the MKB.

DETAILED DESCRIPTION OF THE EMBODIMENTS

Embodiments of the present invention will be explained in detail with reference to accompanying drawings.

Figure 1:
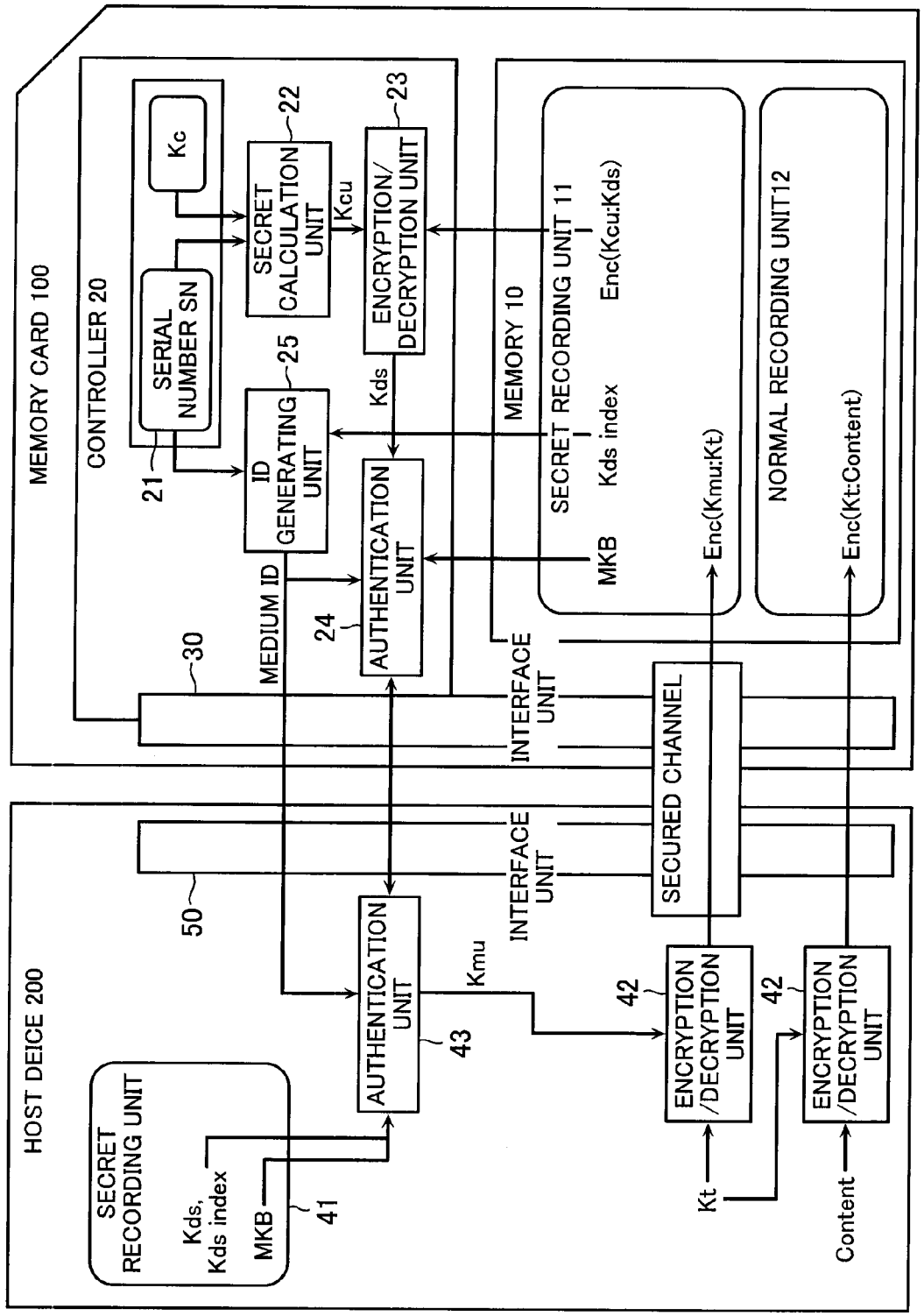
FIG. 1 shows an overall configuration of a content-data playback system according to a first embodiment of the present invention.

FIG. 1 shows a memory card 100 as an example recording device according to a first embodiment of the present invention, and a host device 200 which is capable of playback content data using data in the memory card 100. The memory card 100 comprises a memory 10, a controller 20 controlling the memory 10, and an interface unit 30.

The memory card 100 comprises a secret recording unit 11, and a normal recording unit 12.

The secret recording unit 11 becomes accessible when, for example, an authentication process between the memory card 100 and the host device 200 is completed. In this embodiment, the secret recording unit 11 stores an MKB (Media Key Block), an encrypted device key Enc(Kcu:Kds), a device-key-set index Kds Index, and an encrypted title key Enc(Kmu:Kt) which is a first key.

The MKB is generated by encrypting a medium key Km used as base key for encryption of content data with a device key set Kds. The device key set Kds is a collection of device keys Kd provided in the host device 200 as a secret key. Moreover, the encrypted device key Enc(Kcu:Kds) is generated by encrypting the device key set Kds with a controller-unique key Kcu to be discussed later. The device-key-set index Kds Index is a reference numeral allocated to the device key set Kds, and uniquely identifies the device key sets Kds one by one.

The controller 20 is provided with a controller key Kc and a serial number SN which is identification information unique for each controller 20. The Controller-unique key Kcu unique to the controller 20 is generated based on the controller key Kc and the serial number SN.

Data of the controller key Kc differs, for example, for each production lot. Moreover, the serial number SN is a different number for each chip. Consequently, the controller-unique key Kcu becomes different (controller-unique) data unique for each controller.

In contrast, the normal recording unit 12 is freely accessible without an authentication process, and stores encrypted content data Enc(Kt:Content) generated by encrypting content data Content with a title key Kt which is a first key.

The controller 20 comprises a memory unit 21, a secret calculation unit 22, an encryption/decryption unit 23, a first authentication unit 24, and an ID generating unit 25.

The memory unit 21 stores the controller key Kc and the serial number SN both unique to the controller 20.

The secret calculation unit 22 generates the controller-unique key Kcu based on the controller key Kc and the serial number SN. As an example, an operation is executed using the controller key Kc and the serial number SN as input values to a one-way function, and an output value thereof is set to be the controller-unique key Kcu.

The encryption/decryption unit 23 encrypts the device key set Kds with the controller-unique key Kcu, and decrypts the encrypted device key set Enc(Kcu:Kds) using the controller-unique key Kcu. In addition, the encryption/decryption unit 23 bears a part of decrypting, using the controller key Kc, the encrypted device key set Enc(Kc:Kds), which is generated by encrypting the device key set Kds with the controller key Kc.

The first authentication unit 24 obtains the medium key Km by decrypting the MKB with the device key set Kds, generates a medium-unique key Kmu through a hash process in accordance with a medium ID, and executes authentication based on matching/mismatching of such key. That is, the first authentication unit 24 executes authentication with the exterior in accordance with the device key set Kds, the MKB, and the medium ID. Note that the medium-unique key Kmu is transmitted/received through the interface unit 30, an interface unit 50, and a secured channel. The ID generating unit 25 generates the medium ID based on the serial number SN, and the device-key-set index Kds Index.

In contrast, the host device 200 comprises a secret recording unit 41, an encryption/decryption unit 42, and a second authentication unit 43. The secret recording unit 41 stores the foregoing device key set Kds, the device-key-set index Kds Index, and the MKB.

The encryption/decryption unit 42 bears a part of encrypting the title key Kt with the medium-unique key Kmu to generate the encrypted title key Enc(Kmu:Kt), and of decrypting the encrypted device key set Enc(Kc:Kds) with the controller key Kc. The second authentication unit 43 obtains the medium key Km by decrypting the MKB with the device key set Kds, generates the medium-unique key Kmu through a hash process in accordance with the medium ID received from the ID generating unit 25, and executes authentication based on matching/mismatching of such key.

As explained above, according to the content-data playback system of this embodiment, the controller-unique key Kcu is generated based on the controller key Kc of the controller 20 and the serial number SN thereof at the controller 20 in the memory card 100. Only the controller manufacturing company knows the controller key Kc, and the algorithm of the secret calculation unit 22, and such information is stored in a packaged chip in the controller 20 in an externally-unreadable manner. The controller-unique key Kcu generated based on the controller key Kc and the serial number SN is also used in only the controller 20, and is not externally-readable.

Moreover, the device key set Kds is encrypted with the controller-unique key Kcu and stored in the memory 10. Information for an authentication process using the MKB is encrypted with the controller-unique key Kcu unique to the controller 20. Consequently, unless a controller manufacturing company externally leaks out the information on the controller key Kc, no misconduct happens in an authentication process using the MKB, so that content data can be rigidly protected against fraudulent use.

Figure 2:
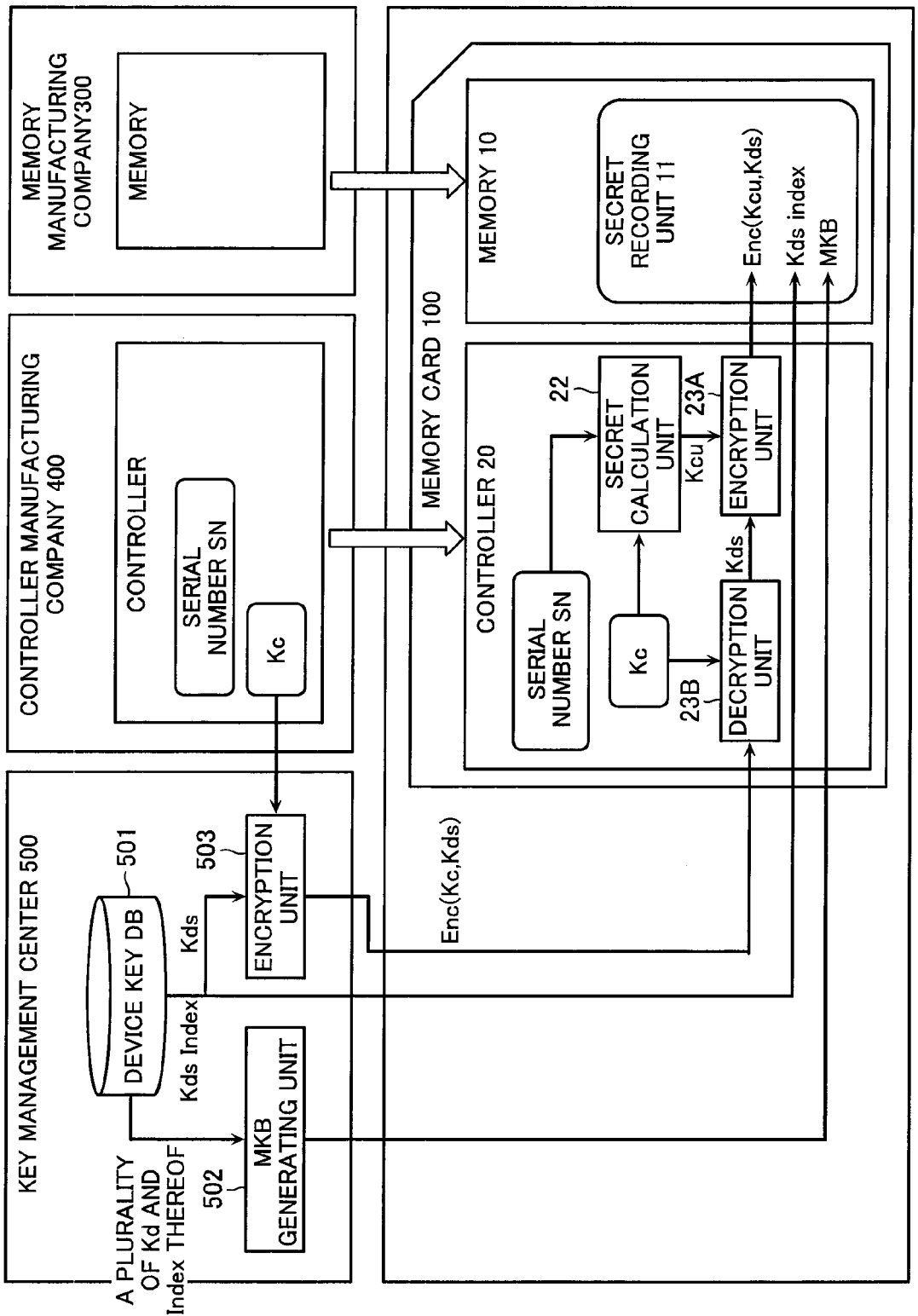
FIG. 2 shows steps of writing-in various data in a memory 10 in the system shown in FIG. 1.

Next, writing-in procedures of data shown in FIG. 1 in the memory 10 will be explained with reference to FIG. 2. The device key set Kds, and the device-key-set index Kds Index are supplied from a key management center 500, and written in the memory 10 through the controller 20. Although it is not illustrated in FIG. 2, let us suppose that the memory card 100 is connected to a device having a predetermined communication function, and is in a writable condition of data from the key management center 500.

The memory 10 and the controller 20 configuring the memory card 100 are supplied from a memory manufacturing company 300 and a controller manufacturing company 400, respectively. In the embodiment, the controller manufacturing company 400 has information on the foregoing controller key Kc and on the serial number SN, and supplies the controller key Kc to the key management center 500.

The key management center 500 comprises a device key data base 501, an MKB generating unit 502, and an encryption unit 503. The device key data base 501 stores a plurality of device keys Kd, and indexes Kd Index of the device keys Kd. The MKB generating unit 502 generates the MKB in accordance with the device key Kd and the index Kd Index supplied from the device key data base 501. The encryption unit 503 receives the device key set Kds from the device key data base 501, and generates the encrypted device key set Enc(Kc:Kds) by encrypting the device key set Kds with the content key Kc.

The controller 20 obtains the device key set Kds by decrypting the encrypted device key set Enc(Kc:Kds) with the controller key Kc at an decryption unit 23B which is a part of the encryption/decryption unit 23. Moreover, the secret calculation unit 22 generates the controller-unique key Kcu using the serial number SN and the controller key Kc. An encryption unit 23A, which is a part of the encryption/decryption unit 23 generates the encrypted device key set Enc(Kcu:Kds) by encrypting the device key set Kds with the controller-unique key Kcu, and stores such a key set in the secret recording unit 11. The foregoing MKB and the device-key-set index Kds Index are also stored in the secret recording unit 11.

In this manner, the device key set Kds is encrypted with the controller-unique key Kcu unique to the controller 20, and stored in the memory 10. The controller-unique key Kcu is generated based on the controller key Kc and the serial number SN at the secret calculation unit 22 in the controller 20, so that the risk of leaking out such information is little, and thus the device key set of the MKB can be securely stored.

Figure 3:
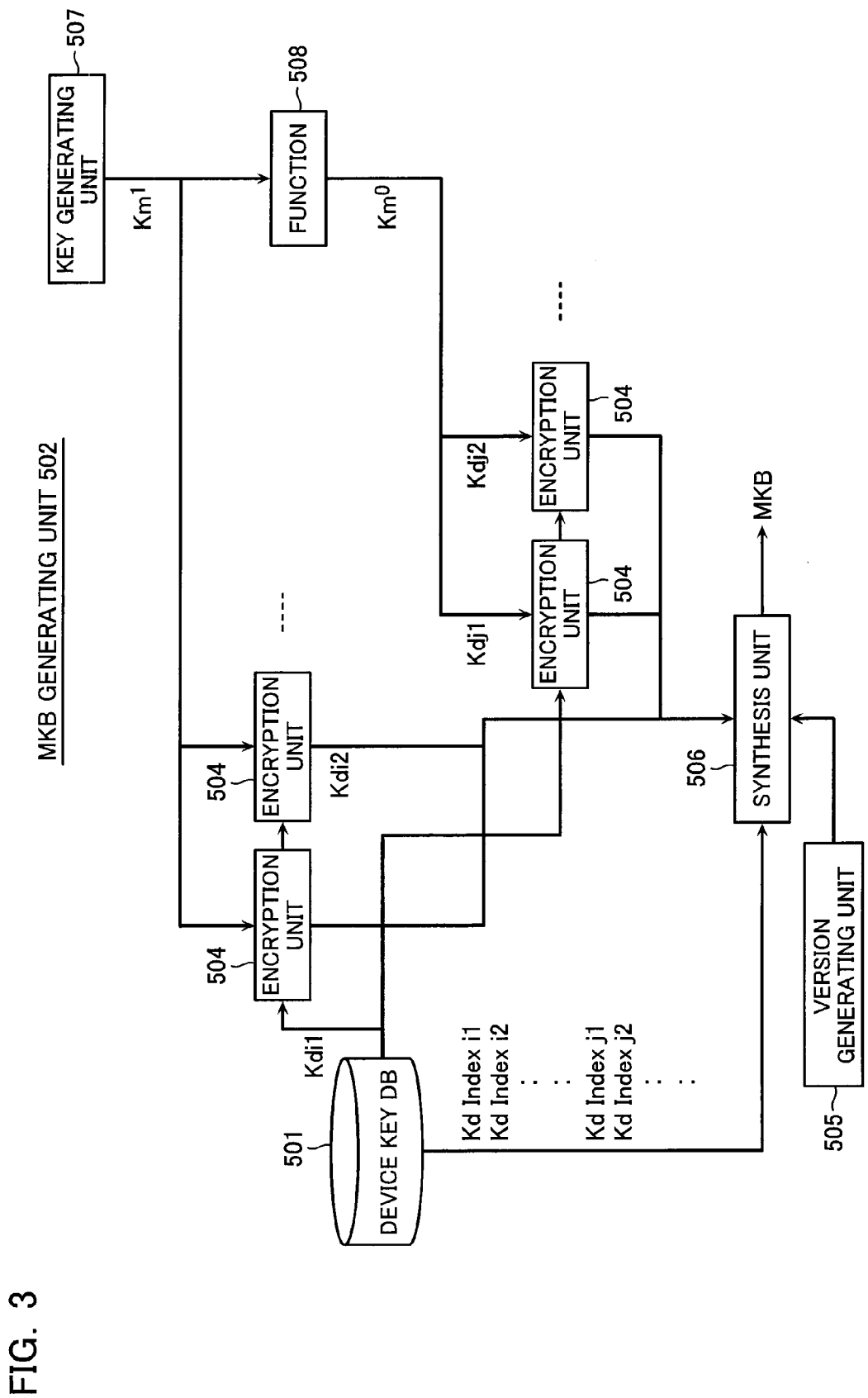
FIG. 3 is for explaining an example configuration of an MKB generating unit 502.

Next, an example configuration of the MKB generating unit 502 will be explained with reference to FIG. 3. The MKB generating unit 502 comprises an encryption unit 504, a version generating unit 505, a synthesis unit 506, a key generating unit 507, and a one-way function operation unit 508.

The encryption unit 504 encrypts device keys Kdi1, Kdi2, . . . Kdj1, Kdj2, . . . and the like supplied from the device key data base 501 using a medium key Km1 or Km0. The device keys Kdi1, Kdi2 . . . and the like are supplied to the host device 200, and the device keys Kdj1, Kdj2 . . . and the like are supplied to the memory card 100.

The version generating unit 505 generates version information on the MKB. It becomes possible to make more fraudulent devices invalid by distinguishing the newness of the MKB generated by the version information, and by using the newer MKB. The synthesis unit 506 has functions of synthesizing the encrypted medium key generated by the encryption unit 504 to generate the MKB, and also of adding the version information thereto.

The key generating unit 507 generates the foregoing medium key Km1. The one-way function operation unit 508 inputs the foregoing medium key Km1 to a one-way function in order to execute an operation, and generates the medium key Km0.

Figure 4:
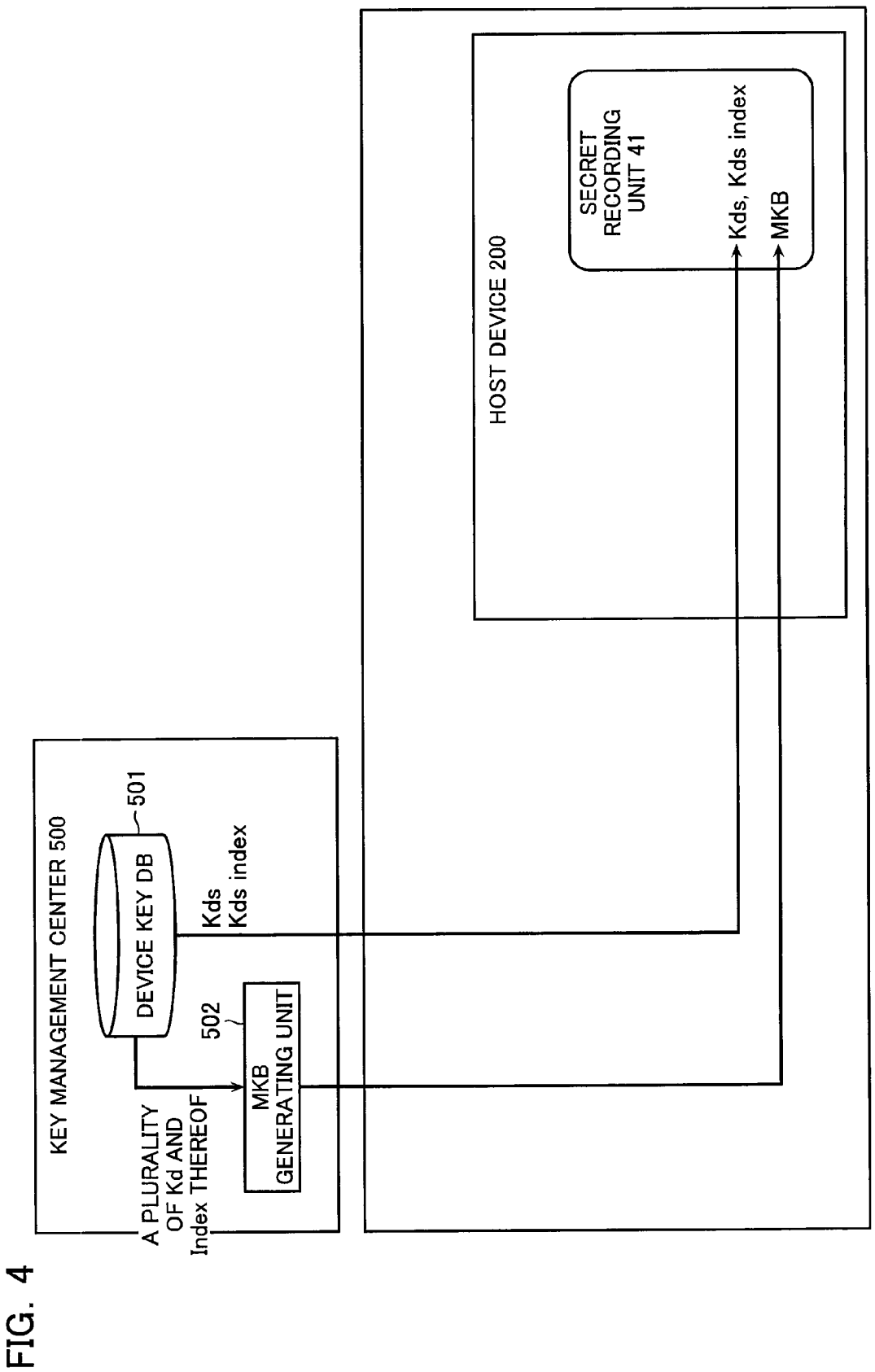
FIG. 4 is for explaining a modified example of the first embodiment.

In the foregoing explanation, although the device key set Kds and others are encrypted and stored in the secret recording unit 11 of the memory card 100, instead of this manner, for example, as shown in FIG. 4, the device key set Kds, the device-key-set index Kds Index, the MKB, and the like may be once stored in the secret recording unit 41 of the host device 200 to which the memory card 100 is connected, and then those keys and the like may be encrypted and transmitted to the secret recording unit 11 of the memory 10.

Figure 5:
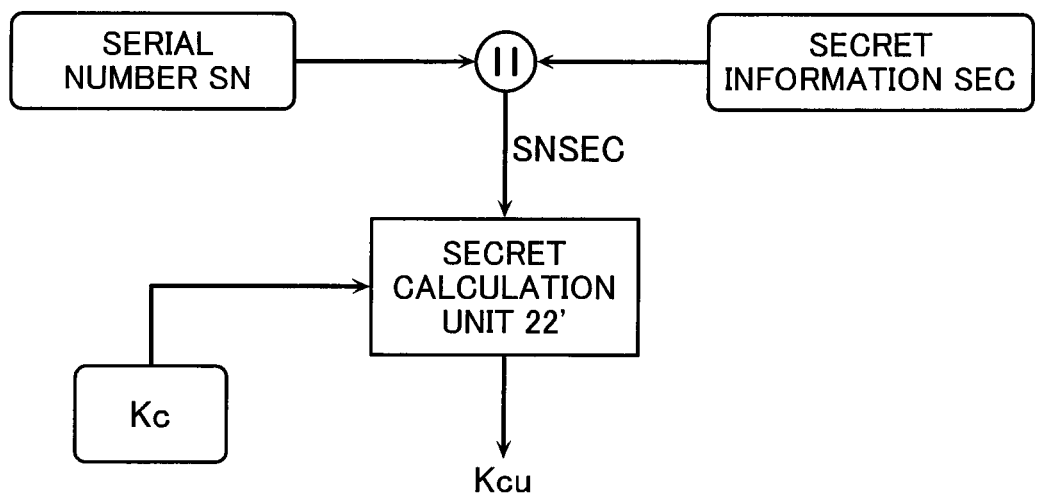
FIG. 5 is for explaining a characteristic part of a content-data playback system according to a second embodiment of the present invention.

Next, a second embodiment of the present invention will be explained with reference to FIG. 5. This embodiment differs from the first embodiment that the controller 20 has a secret calculation unit 22' instead of the secret calculation unit 22, but others are same as the first embodiment. The secret calculation unit 22' generates the controller-unique key Kcu in accordance with inputting of secret information SEC supplied to the controller 20 in addition to the serial number SN and the controller key Kc. For example, data SNSEC is generated by combining the serial number SN with the secret information SEC, and an operation of the one-way function is executed using the SNSEC and the controller key Kc as input values. The controller-unique key Kcu is to be generated as an output value of such operation.

Although the embodiments of the present invention have been explained, the present invention is not limited to those embodiments, and can be changed and modified in various forms without departing from the scope and spirit of the present invention.

What is claimed is:

1. A memory device, comprising:

a storage; and a controller, wherein the controller is embedded with controller key data and value data during a manufacturing process, the value data being unique to the controller, the controller is configured to decrypt encrypted private key data using the controller key data, the encrypted private key data being generated by encrypting private key data using the controller key data outside the controller, the controller is configured to generate the private key data by decrypting the encrypted private key data using the controller key data, encrypt the private key data using controller unique key data, and generate the controller unique key data by performing a calculation in which the value data and the controller key data are input to a one-way function, the controller is configured to generate new encrypted private key data by encrypting the private key data using the controller unique key data, and write the new encrypted private key data in the storage, the controller is configured to receive the private key data from outside of the controller in a key data set as a group of key data provided as a private key, the private key data is encrypted by a first vendor using the controller key data, the controller key data is embedded in the controller by a second vendor that manufactures the controller, the second vendor being different from the first vendor, and the value data and the encrypted private key data are inputted to the controller.

2. The memory device according to claim 1, wherein the controller is configured to write the new encrypted private key data to the storage together with information specifying the private key data uniquely.

3. The memory device according to claim 2, wherein the controller is configured to certify information obtained from outside the memory device.

4. A memory device, comprising:

a controller; and a storage, wherein the controller is embedded with controller key data and value data during a manufacturing process, the controller is configured to decrypt encrypted private key data using the controller key data, the encrypted private key data being generated by encrypting private key data using the controller key data outside the controller, the controller is configured to generate the private key data by decrypting the encrypted private key data using the controller key data, encrypt the private key data using controller unique key data, and generate the controller unique key data by performing a function calculation using the value data and the controller key data as inputs, the controller is configured to generate new encrypted secret key data by encrypting in the controller the private key data using the controller unique key data, and write the new encrypted secret key data in the storage, the private key data is encrypted by a first vendor using the controller key data, the controller key data is embedded to the controller by a second vendor that manufactures the controller, the second vendor being different from the first vendor, and the value data and the encrypted private key data are inputted to the controller.

5. The memory device according to claim 4, wherein the controller is configured to generate the controller unique key data by performing a calculation in which the value data and the controller key data are input to a one-way function.

6. The memory device according to claim 4, wherein the controller is configured to receive information from the second vendor, the information being key data set information as a group of key data provided as a private key, and the key data set information is provided to the controller after being generated in the second vendor.

7. A memory device, comprising:
a storage; and
a controller, wherein the controller is embedded with controller key data and value data unique to the controller, and the storage is written with encrypted private key data, the encrypted private key data being generated by encrypting private key data using the controller key data outside the controller, decrypting the private key data in the controller, and then encrypting the private key data using unique key data that is based on the controller unique key data and the value data, the private key data is encrypted by a first vendor using the controller key data, the controller key data is embedded to the controller by a second vendor that manufactures the controller, the second vendor being different from the first vendor, the value data and the encrypted private key data are inputted to the controller, the unique key data is generated by performing a calculation in which the value data and the controller key data are input to a one-way function, and the encrypted private key data generated by using the unique key data is written in the storage together with information specifying the private key data uniquely.

* * * * *